No. 721,459. PATENTED FEB. 24, 1903.
J. H. McCORMICK.
CASH REGISTER.
APPLICATION FILED MAY 11, 1898.
NO MODEL. 7 SHEETS—SHEET 1.

WITNESSES: INVENTOR.
Wm. McCarthy John H. McCormick
BY
Alvan Macauley
ATTORNEY.

No. 721,459. PATENTED FEB. 24, 1903.
J. H. McCORMICK.
CASH REGISTER.
APPLICATION FILED MAY 11, 1898.
NO MODEL. 7 SHEETS—SHEET 2.

WITNESSES:
Wm. McCarthy
William Muzzy

INVENTOR.
John H. McCormick
BY Alvan Macauley
ATTORNEY

No. 721,459. PATENTED FEB. 24, 1903.
J. H. McCORMICK.
CASH REGISTER.
APPLICATION FILED MAY 11, 1898.
NO MODEL.
7 SHEETS—SHEET 3.

WITNESSES:
Wm. McCarthy
William Shuggy

INVENTOR.
John H. McCormick
BY
Alvan Macauley.
ATTORNEYS

No. 721,459. PATENTED FEB. 24, 1903.
J. H. McCORMICK.
CASH REGISTER.
APPLICATION FILED MAY 11, 1898.
NO MODEL.
7 SHEETS—SHEET 5.

WITNESSES:                                         INVENTOR.

UNITED STATES PATENT OFFICE.

JOHN HENRY McCORMICK, OF DAYTON, OHIO, ASSIGNOR, BY MESNE ASSIGN-MENTS, TO NATIONAL CASH REGISTER COMPANY, OF JERSEY CITY, NEW JERSEY, A CORPORATION OF NEW JERSEY.

CASH-REGISTER.

SPECIFICATION forming part of Letters Patent No. 721,459, dated February 24, 1903.

Application filed May 11, 1898. Serial No. 680,358. (No model.)

*To all whom it may concern:*

Be it known that I, JOHN HENRY McCOR-MICK, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash-registers, and has more particular relation to improvements in registers of the type patented to Thos. Carney and numbered 532,763, dated January 22, 1895, and to C. E. Lord, No. 470,247, dated March 8, 1892.

One of the several objects of the invention is the application of an improved coin-displaying device to the class of machine mentioned.

A further object is the application of an improved guard or shield to the indicators, whereby they are concealed until completely raised.

Still another object is the combining of an improved form of autographic device with the register.

The invention consists of certain novel constructions, combinations, and arrangements of parts, all of which will be hereinafter more particularly set forth and claimed.

In the appended drawings, forming part of this specification.

In the aforesaid drawings, 1 represents the cabinet or casing of the register proper, 2 the cabinet of the autographic attachment, and 3 the coin-displayer.

The registering and indicating mechanisms of the register proper are substantially of the construction and operation disclosed in the aforesaid Patent No. 470,247, and attention is therefore directed to the same for a detail description of the said parts.

Figure 1:
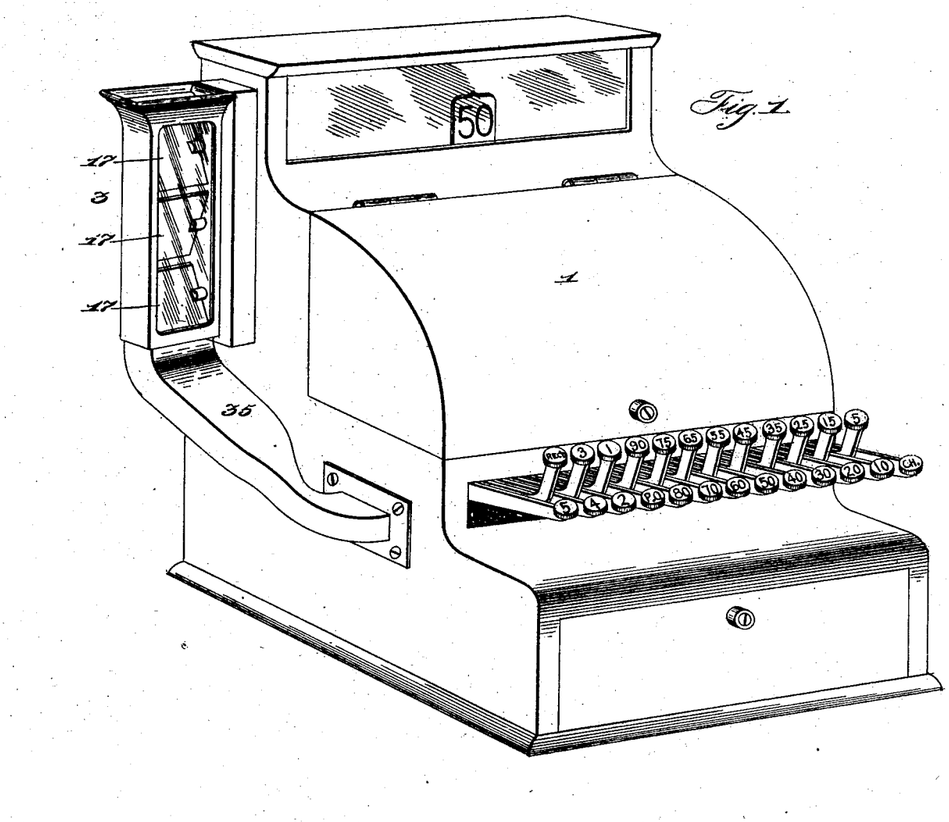
Figure 1 represents a perspective view of a machine embodying my invention.
Figure 2:
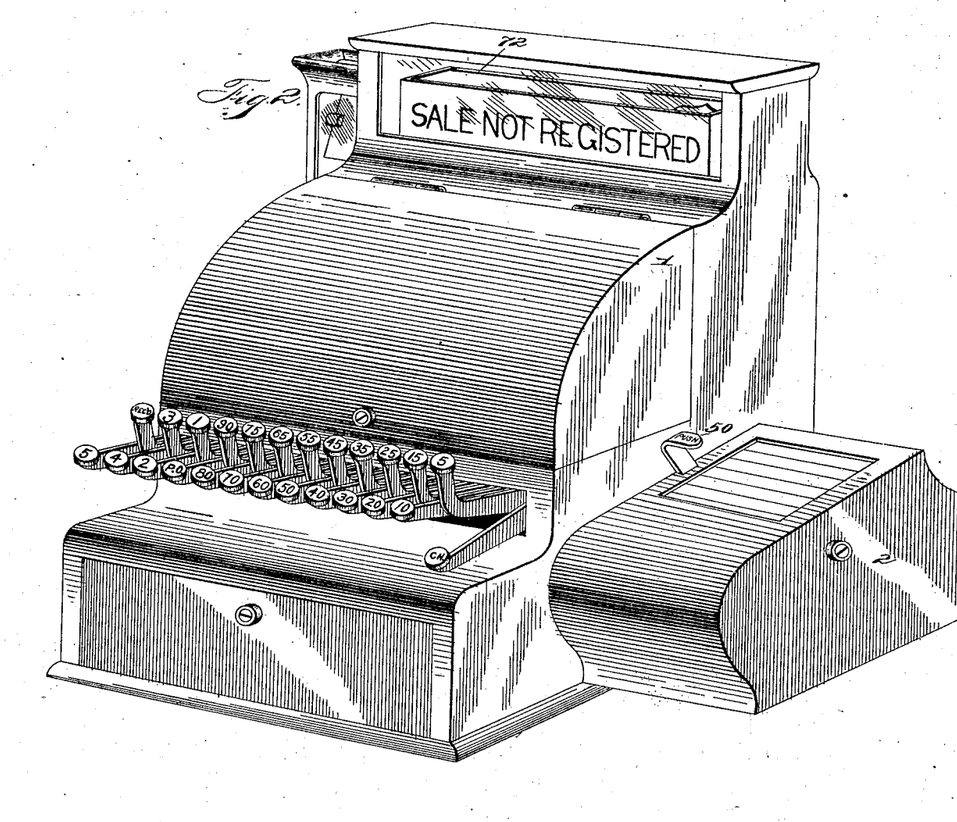
Fig. 2 represents a similar view taken from the opposite side of the machine.
Figure 3:
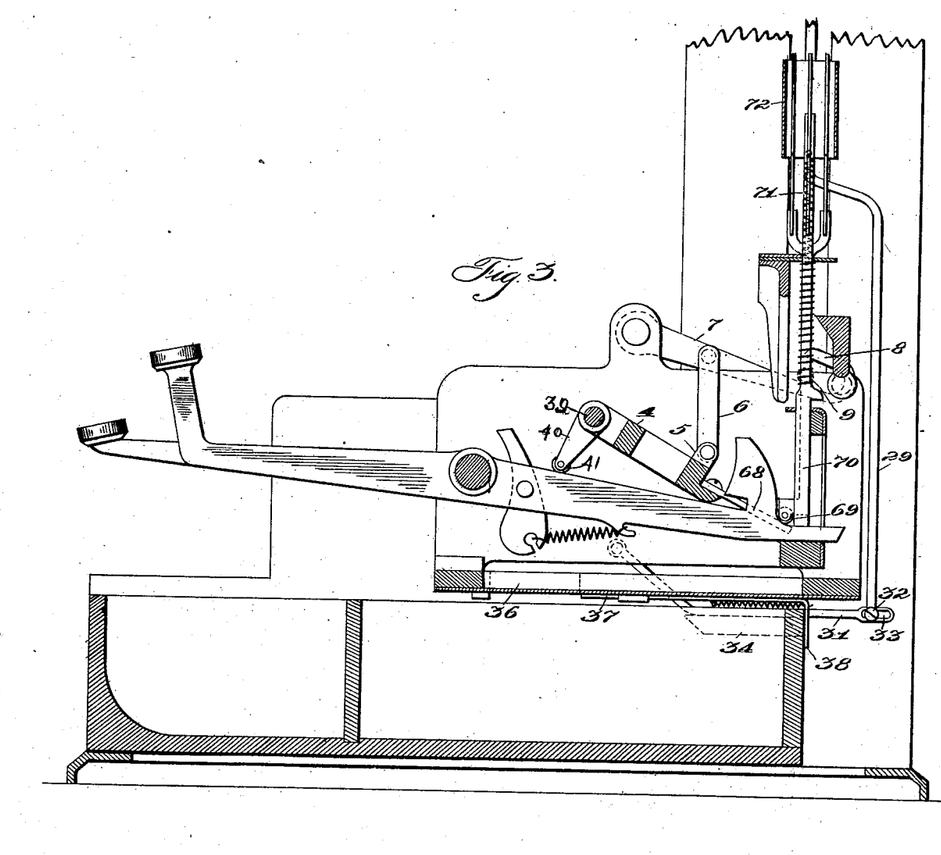
Fig. 3 represents a vertical transverse section, partly broken away, through said machine, the cabinet being removed.
Figure 4:
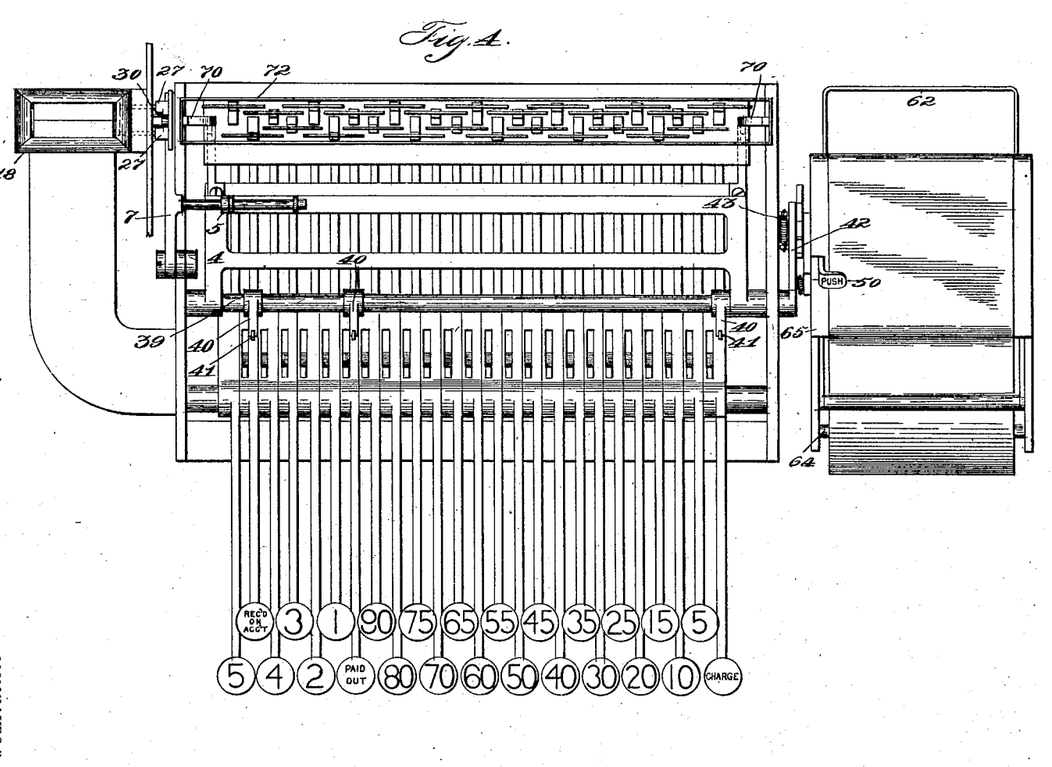
Fig. 4 represents a top plan view of said devices.
Figure 5:
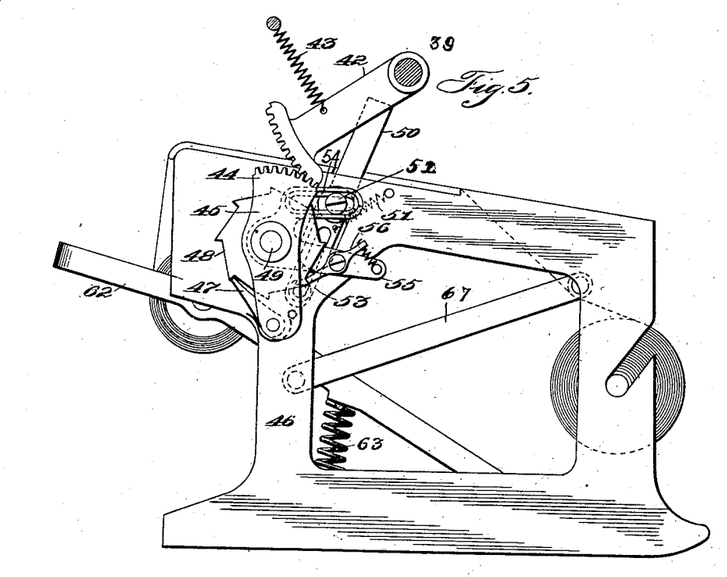
Fig. 5 represents a side elevation of the autographic device detached from the machine and with its casing removed.
Figure 6:
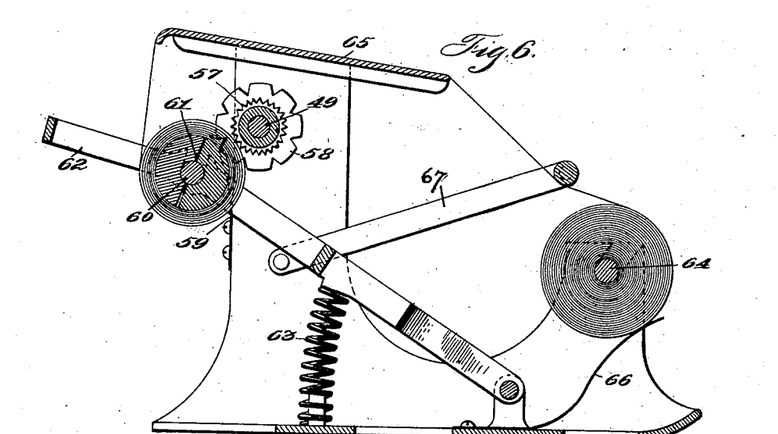
Fig. 6 represents a central vertical section through the same.
Figure 7:
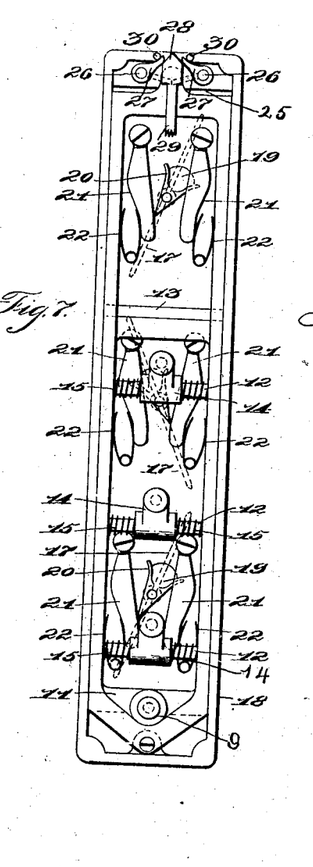
Fig. 7 represents a rear elevation of the coin-displaying device detached from the machine.
Figure 8:
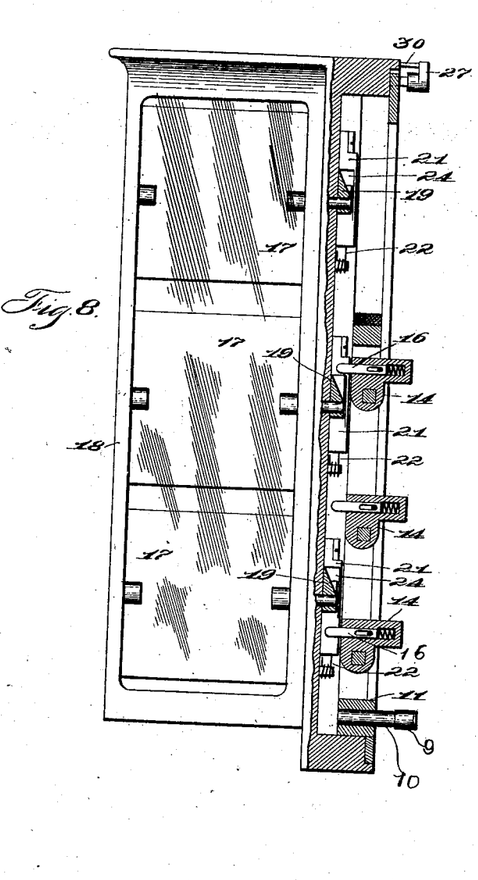
Fig. 8 represents a side elevation, partly in section, of the same.
Figure 9:
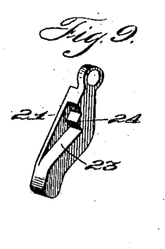
Fig. 9 represents an enlarged detail perspective view of one of the guiding and locking arms of the coin-displaying device.
Figure 10:
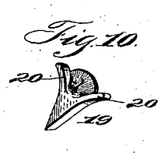
Fig. 10 represents an enlarged detail perspective view of one of the shutter-shifting frogs of the coin-displayer.
Figures 11, 12:
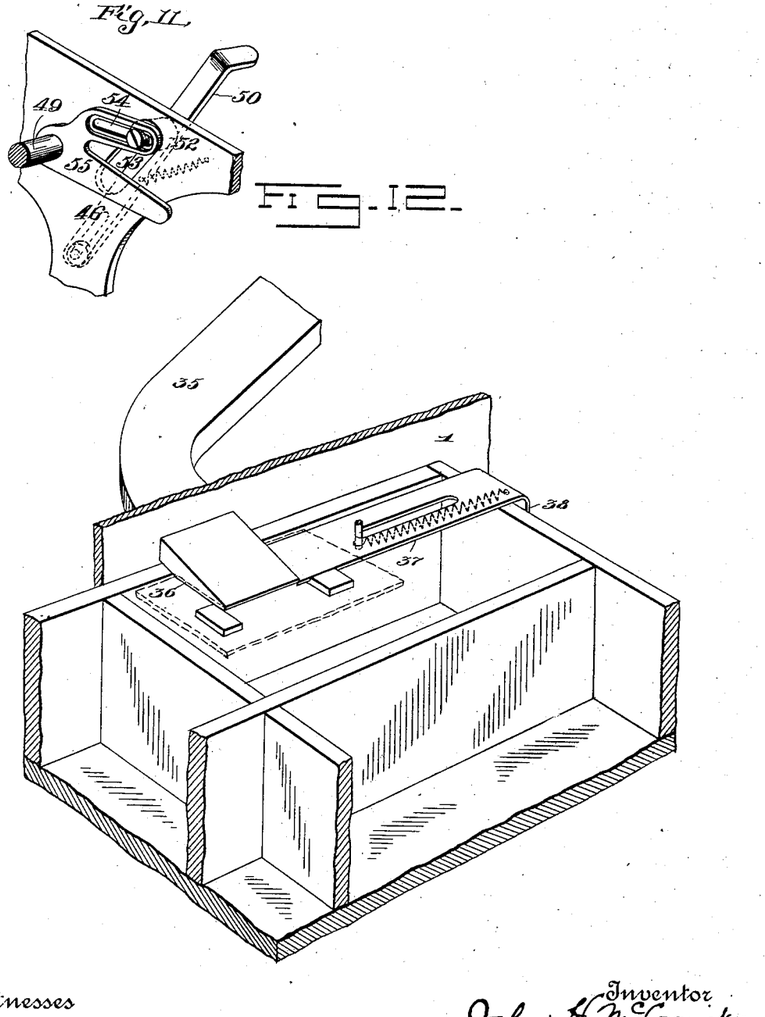
Fig. 11 represents an enlarged detail perspective view of the special key or slide of the autographic attachment and the devices connecting it to the frame.
Fig. 12 represents an enlarged detail perspective view of a portion of the casing, coin-chute, and cash-drawer, and the slide for closing the discharge-opening of said chute.

In providing my machine with the improved coin-displayer 3 I first provide the key-coupler 4, which is of the usual construction, with apertured lugs 5, in which is pivoted an angular link-bar 6, which in turn is pivotally connected to a pivoted operating-lever 7, mounted upon the main frame of the machine. This lever is formed at one end with a hook or loop 8, which is arranged to embrace an antifriction-roller 9, Fig. 8, mounted upon an operating-stud 10, which is carried by a slide 11. This slide is mounted in suitable guiding-grooves formed in the frame of the coin-displayer and comprises a rectangular frame having spaced horizontal guide-bars 12 and an elastic buffer 13, mounted on top of said frame and adapted to form a shock-absorbing stop for limiting the upward movement of said slide. Each of the aforesaid guide-bars 12 is provided with a sliding apertured block 14, normally held in the middle of its respective bar by coil-springs 15, mounted upon said bar upon opposite sides of the said block. Each of the said blocks 14 is further provided with a spring-pressed plunger 16, which normally protrudes from the face of the block, but may be forced into the recess of the same against the tension of its spring at will. The office of these spring-pressed plungers is to oscillate the coin-holding shutters 17, which are constructed of some suitable transparent material and are mounted one below the other in the chute 18, the side walls of said chute being constructed of some transparent material, so that the coins resting upon said shutters may be readily observed. One of the extended journal ends of said shutter is provided with an approximately V-shaped frog 19, fast thereto and reduced above its middle to form an incline surface having side guiding-flanges 20, as fully illustrated in Fig. 10. To each side of each of the said frogs is arranged a pivoted guiding and locking lever 21. Each of these levers is normally forced forward into contact with its respective frog by a suitable bow-spring 22 and is formed in its inner side with a recess 23 and provided with a shoulder 24. When the slide 11 is moved upward by the operation of the lever 7, the plungers 16 strike their respective frogs 19 in succession, so that the movements of the shutters are successive from the bottom upward.

Each of the frogs is normally locked against any accidental movement by the end of one or the other of its flanges 20 catching under one of the shoulders 24. As the slide 11 moves upward each of the plungers 16 engages its respective frog upon either one or the other side of its pivot-point and travels along the incline surface of said frog until it contacts with and forces back the locking-lever 21, and thus releases the frog, so that it may be turned to its reverse position by the continued movement of said plunger. After one of the plungers has contacted with its frog its continued movement causes it and its slide to move laterally upon the respective guide-bar 12 until after the top of the frog is passed, when the plunger is returned to its middle position. Upon the downward movement of the slide 11 the plungers pass between the respective flanges 20 and up over the inclined surfaces of the frogs without in any wise moving the latter.

It will be observed from the above that when a coin is dropped into the upper end of the chute 18 it will be arrested by the uppermost shutter and will rest upon its edge in full sight from both sides of the machine. Upon the first succeeding operation of the slide 11 the positions of the shutters are reversed, as before described, and the coin drops from the uppermost shutter to the one below, while a new coin inserted into the chute will be arrested by the first-mentioned shutter. By this means the number of coins exhibited will be equal to the number of shutters, which in the present case is three. As it is desirable to close the upper end of the chute except when the cash-drawer of the machine is open, I provide the mouth of said chute with two pivoted lips 25, having extended journal ends 26, which are provided with operating-arms 27, fast thereto and adapted to be actuated by the enlarged head 28 of an operating-rod 29 to close them. The upward movements of the arms 27 are limited by stop-pins 30, located above said arms and arranged to stop the same when the edges of the lips are brought together. The aforesaid rod 29 is mounted in suitable guides on the frame and is connected at its lower end to an angular pivoted lever 31 by means of a pivot-pin 32, which projects through a slot 33, formed in said lever. This pivoted lever is arranged to be operated upon the closing of the drawer by a flange or projection 34, mounted on said drawer and having an incline end which is adapted to contact with said lever upon the closing of the drawer.

It will be seen from the above that when the drawer is closed the rod 29 is forced upward, and thus closes the lips at the top of the chute and prevents the removal of the coin resting upon the top shutter. The coin is discharged from the lower end of the chute proper into an auxiliary chute 35, which is connected thereto and discharges into the side of the cabinet directly above an opening 36 in the drawer-casing. A spring-drawn slide 37, mounted in suitable guides, is arranged to close said opening 36 when the drawer is open, and thus prevent the coin from dropping elsewhere but in the drawer. This slide is provided at one end with a pendent arm 38, which extends into the path of the drawer, so that when it is closed the slide will be drawn back against the tension of its spring, and thus leave the opening 36 unobstructed.

The before-mentioned key-coupling frame 4 is mounted on a rock-shaft 39, which latter is provided with a plurality of operating-arms 40, carrying antifriction-wheels 41 at their outer ends. The said operating-arms are arranged in alinement with any desired keys of the machine, in the present instance the special keys, but may be arranged in alinement with all of said keys, if so desired. Upon the operation of a key in alinement with any one of said arms the shaft 39 is rocked and imparts said rocking motion to a segmental rack 42, fast on one end thereof and normally held in a partly-elevated position by a coil-spring 43, connected thereto and to a portion of the frame of the machine. This rack 42 meshes with a segmental rack 44, formed on a lever 45, which is pivotally mounted upon a shaft 49 of the autographic attachment. A spring-pressed pawl 47 is pivotally mounted upon the lever 45 and normally engages a ratchet-wheel 48, which is mounted rigidly upon the transverse feeding-shaft 49, so as to move said shaft when the lever is operated. As the said lever 45 is only operated upon the depression of one of the special keys, it becomes necessary to provide some means for moving the feed-shaft 49 at other times. This feeding means comprises a slide 50, having a finger-piece at its upper end and movably mounted upon the frame 46 by a suitable slot-and-pin connection, and a spring 51, connecting said slide and frame, whereby the former is normally held in its upper position. The slide is further provided with a laterally-projecting stud 52, a portion of which is adapted to operate in a diagonal slot 53 in the frame 46, while the extended end of said stud enters a slot 54, formed in a bell-crank lever 55, which is pivotally mounted upon the shaft 49. A pivoted spring-pressed pawl 56 is mounted upon the lever 55 and engages the ratchet-wheel 48, so that when the slide 50 is depressed and the bell-crank lever operated said ratchet will be moved one notch. The before-mentioned feeding-shaft 49 is provided with two toothed feeding-wheels 57 and a retaining star-wheel 58. The latter is engaged by a retaining-spring 59, while the former are arranged to feed the paper by engaging the same as it winds about the feeding-roller 60. The trunnions of this feeding-roller are mounted in recesses or sockets 61, formed in a pivoted yoke-support 62, which is normally forced upward by a coil-spring 63, interposed between it and the base of the frame. The upper portion of this yoke is extended, so that it may be grasped by the hand and drawn down to permit of the roller 60 being removed. The spring-pressure upon the yoke-frame also forces the roller 60 upward, so that the paper is forced firmly against the toothed wheels 57 and all slipping between said wheels and paper thereby prevented.

A supply-roller 64 is suitably journaled upon the frame 46, so that the paper thereon may pass upward and over the writing-table 65 and then down to the winding-roller 60. As there is some liability of the paper becoming slack, I provide a retaining-spring 66, adapted to engage the roller 64, and a pivoted weighted yoke 67, adapted to rest upon the stretch of paper between said roller and the table 65. The cabinet 2, which is placed about the autographic attachment, may be of any desired construction, with an aperture in its upper portion above the writing-table 65. In addition to the attachments before mentioned the key-coupler 4 is provided with two rearwardly-extending arms 68, arranged near opposite ends of the same and adapted when raised to engage and raise antifriction-rollers 69, mounted on the lower ends of vertical rods 70, movably mounted in the main frame and normally held down by coil-springs 71. The upper ends of the said rods 70 are connected to a frame 72, having characters indicating "Sale not registered" on the opposite sides thereof.

It will be seen from the above that when any key is operated and the key-coupler correspondingly raised that the "Sale not registered" sign is raised upon both sides of the tablets and remains so until the operated indicator-tablets 70ª, which are of any suitable kind or construction, have been completely raised, when it drops with the key-coupler and leaves the numerals exposed. By this device a partial raising of one of the tablets to a partly-exposed position is impossible, as the tablet cannot be exposed to view at all until it and the "Sale not registered" sign have been fully raised, so as to allow the latter to drop out of the exposed position. By means of the peculiar structure of the feed devices of the autographic attachment a uniform feed is secured at all times, no matter how large the winding-roller may become by the addition of paper thereto. This effect is secured because the feed is always from the periphery of the roll and not from the roller proper, which latter would cause a different feed as the roller grew larger if the power were applied thereto.

While I have illustrated my invention as applied to the well-known type of detail-adding machines provided with the ordinary form of key-coupler, I do not wish to confine myself to this class of register, as my devices may be attached equally well to other forms of key-machines.

Having thus described my invention, what I claim as new, and desire to secure by Letters Patent, is—

1. The combination with a cash-register, of a coin-chute, a series of coin-supporting shutters pivoted therein, rocking frogs connected to said shutters, means for actuating said frogs upon the operation of the machine and locking devices for locking said frogs in the positions to which they are moved.

2. In a cash-register, the combination with a series of keys, of a series of indicators arranged to be operated by the same and each provided with an indicating-tablet having indicating characters upon both sides of the same to indicate at both the back and the front of the machine, a movable member common to all of said keys, a movable guard or shield arranged to simultaneously obscure both sides of the indicating-tablets, and spring-pressed rods supporting said shield and arranged to normally hold it in its unexposed position and rigid projections on the common member arranged to engage and raise said rods against the tensions of their springs.

3. The combination with a cash-register, of a coin-chute, a series of coin-supporting shutters pivoted therein, devices for actuating said shutters upon the operation of the machine, and locking means for preventing the operation of said shutters by implements inserted into the casing and otherwise than through said operating devices.

4. The combination with a cash-register, of a coin-chute, a series of coin-supporting shutters, devices for actuating said shutters upon the operation of the machine, and devices for independently locking each shutter against movement otherwise than that imparted to it by the operating devices.

5. The combination with a cash-register, of a coin chute, a series of coin-supporting shutters, rocking frogs connected to said shutters, and a movable member having projections arranged to engage opposite sides of the frogs and alternately shift them in opposite directions.

6. The combination with a cash-register, of a coin-chute, a series of coin-supporting shutters, rocking frogs connected to said shutters, a slide arranged to be actuated upon each operation of the machine, and movable spring-pressed projections mounted on said slide and arranged to engage the opposite sides of said frogs, and shift them first one way and then the other upon succeeding operations of said slide.

7. In a cash-register, the combination with a series of operating-keys, of an autographic device, having a movable strip of writing material, and a common operating means positively and permanently connected to a certain number of the keys and the autographic device whereby the aforesaid strip is moved by the operation of these latter keys, but remains stationary when the remaining keys are operated.

8. In a cash-register, the combination with a series of operating-keys, of an autographic device, and a common operating means arranged to be positively actuated by any one of a certain number of said keys and connected to said autographic device for operating the same, the operation of the remaining keys having no effect upon said autographic device.

9. In a cash-register, the combination with a series of operating-keys, of an autographic device, a common operating means arranged to be positively actuated by any one of a number of said keys and connected to said autographic device whereby the autographic strip is moved upon the operation of said special keys but remains stationary upon the operation of the remaining keys, and means for operating said autographic device independently of the aforesaid keys.

10. In a cash-register, the combination with a series of operating-keys, of an autographic device, a common operating means arranged to be positively actuated by any one of a certain number of said keys and connected to the autographic device whereby any one of said special keys will actuate the autographic device while the remainder of said keys will have no effect upon the same, a special independent key, and a ratchet-wheel for operating said autographic device arranged to be moved by said special key.

11. The combination with a cash-register, of a coin receptacle or displayer arranged to discharge into a cash-drawer, a slide, a spring for drawing said slide normally over the discharge end of the chute, a cash-drawer and a projection on said slide arranged to be struck by the cash-drawer to draw the slide away from the discharge-opening against the tension of its spring, to permit the discharge of coins into said drawer only when the same is closed.

12. The combination with a cash-register, of a coin-chute, a series of shutters pivoted at their middles in said chute so as to extend to opposite sides of said pivots and normally assume vertically-inclined positions in said chute and rocking devices connecting said shutters with the movable parts of the machine for alternately rocking said shutters in opposite directions so that the coins will rest first against one side and then against the other side of each shutter.

13. The combination with a cash-register, of a coin-chute, a plurality of shutters pivoted therein, rocking frogs connected to said shutters, locking-levers for said frogs and shutters, and means for moving first said levers and then the frogs upon the operation of the machine.

14. The combination with a cash-register, of a coin-chute, a plurality of shutters pivoted therein, rocking frogs connected to said shutters, a movable frame connected to the movable parts of the machine, bars mounted on said frame, movable spring-pressed blocks mounted on said bars, and spring-pressed pawls mounted on said blocks and arranged to engage and operate said frogs.

15. The combination with a cash-register, of a coin-chute, shutters mounted therein, frogs for moving the shutters, a slide, frog-operating devices mounted on said slide and springs for holding the operating devices in normal position but allowing them to yield in either direction when operating to shift the frogs either one way or the other.

16. In a cash-register, the combination with a series of keys, of a coin-receptacle, pivoted lips for closing the opening into the same, a series of pivoted shutters in said receptacle, devices for operating said shutters from the keys, a cash-drawer, and means connected to the pivoted lips and operated by said drawer.

17. In a cash-register, the combination with a coin-chute, of a series of movable coin-supporting shutters mounted therein and each carrying a shifting device, latches for said shifting devices, and movable means for operating both the latches and the shifting devices.

18. In a cash-register, the combination with a coin-chute, of a series of coin-supporting shutters pivoted therein, frogs connected to said shutters, latches for holding the frogs in the positions to which they are moved and movable devices arranged to operate the latches and also shift the frogs.

19. In a cash-register, the combination with a coin-chute, of a series of coin-supporting shutters pivoted therein, frogs connected to said shutters, means for actuating said frogs upon the operation of the machine and spring-pressed devices for locking said frogs in the positions to which they are moved.

20. In a cash-register, the combination with a supply-roller, of a feeding device having a serrated periphery arranged for engaging and feeding a paper strip and a feeding-roller mounted upon a pivoted spring-pressed yoke having an extension or handle and arranged to be forced into engagement with the serrated periphery of the feeding device.

21. In a cash-register, the combination with a series of keys, of a series of indicators arranged to be operated by the same and each provided with an indicating-tablet having indicating characters upon both sides of the same to indicate at both the back and front of the machine, a key-coupler common to all of said keys and provided with rigid arms, a movable guard or shield arranged to simultaneously obscure both sides of the indicating-tablets, and spring-pressed rods supporting said shield and resting upon the said rigid arms so as to follow the movements of the coupler.

22. In a cash-register, the combination with a series of keys, of a series of indicators arranged to be operated by the same and each provided with an indicating-tablet having indicating characters upon both sides of the same to indicate at both the back and front of the machine, a key-coupler common to all of the keys, a movable guard or shield arranged to simultaneously obscure both sides of the indicating-tablets and rods supporting said shield and resting upon the key-coupler so as to move therewith.

23. In a cash-register the combination with a series of keys, of a series of indicators arranged to be operated by the same and each provided with an indicating-tablet having indicating characters upon both sides of the same to indicate at both the back and front of the machine, a movable member common to all of said keys and provided with rearwardly-extending rigid arms, a movable guard or shield arranged to simultaneously obscure both sides of the indicating-tablets, and rods supporting said shield and resting upon the said rigid arms so as to move with the common member.

24. In a cash-register, the combination with a series of keys, of a member common to said keys and arranged to be operated by the same, a coin-displayer, shutters for said displayer, a slide for operating said shutters, a pivoted lever for operating said slide and a link connecting the common member and pivoted lever.

25. In a cash-register, the combination with a coin-chute, of a series of shutters pivoted therein so that either side of each may be turned uppermost, and means for turning said shutters so that a coin resting upon one side of one of the same will be allowed to descend while the opposite side of said shutter will be brought into position to support the next succeeding coin.

26. In a cash-register the combination with a series of operating-keys, of an autographic device having a single record-strip, and means arranged to be operated by any one of a certain number of said keys and connected to the autographic device for feeding the strip; the operation of the remaining keys having no effect upon said operating device.

27. In a cash-register the combination with a series of operating-keys, of an autographic device having a single record-strip, and a feeding means for said strip common to and arranged to be operated by any one of a certain number of said keys; the remaining keys having no effect upon said feeding means.

In testimony whereof I affix my signature in the presence of two witnesses.

JOHN HENRY McCORMICK.

Witnesses:
   IRA BERKSTRESSER,
   WILLIAM MUZZY.